US012680335B2

(12) United States Patent
Overbeeke

(10) Patent No.: US 12,680,335 B2
(45) Date of Patent: Jul. 14, 2026

(54) CYLINDER LOCK AND METHOD FOR MOUNTING SUCH A CYLINDER LOCK

(71) Applicant: M & C Protect B.V., Didam (NL)

(72) Inventor: Cornelis Jacobus Johannes Marinus Overbeeke, Didam (NL)

(73) Assignee: M & C PROTECT B.V., Didam (NL)

( * ) Notice: Subject to any disclaimer, the term of this patent is extended or adjusted under 35 U.S.C. 154(b) by 106 days.

(21) Appl. No.: 18/865,298

(22) PCT Filed: May 12, 2023

(86) PCT No.: PCT/NL2023/050265

§ 371 (c)(1),
(2) Date: Nov. 12, 2024

(87) PCT Pub. No.: WO2023/219509

PCT Pub. Date: Nov. 16, 2023

(65) Prior Publication Data

US 2026/0085547 A1 Mar. 26, 2026

(30) Foreign Application Priority Data

May 13, 2022 (NL) ..................................... 2031857

(51) Int. Cl.
*E05B 9/04* (2006.01)

(52) U.S. Cl.
CPC .................................... *E05B 9/042* (2013.01)

(58) Field of Classification Search
CPC . E05B 9/042; E05B 9/041; E05B 9/04; E05B 9/045; E05B 9/10; E05B 2009/004; E05B 27/0007; E05B 27/0014
See application file for complete search history.

(56) References Cited

FOREIGN PATENT DOCUMENTS

| | | | | |
|---|---|---|---|---|
| EP | 3159465 A1 * | 4/2017 | ......... | E05B 27/0071 |
| NL | 2012691 B1 | 7/2016 | | |

OTHER PUBLICATIONS

International Search Report issued in PCT/NL2023/050265 (PCT/ISA/210), mailed on Aug. 2, 2023.
Written Opinion of the International Searching Authority issued in PCT/NL2023/050265 (PCT/ISA/237), mailed on Aug. 2, 2023.

* cited by examiner

*Primary Examiner* — Christine M Mills
*Assistant Examiner* — Christopher F Callahan
(74) *Attorney, Agent, or Firm* — Birch, Stewart, Kolasch & Birch, LLP

(57) ABSTRACT

A cylinder lock that can be simply assembled and disassembled has a cylinder housing, a bridge and a cam. In the cylinder housing, a first locking pin is fixedly received in a locking pin bore. The locking pin passes a cylindrical recess in the cylinder housing transversely. A first cylindrical end of the bridge is provided with a locking pin recess and with a flattened side which extends at least from a free end, remote from a central part of the bridge, of the first cylindrical end of the bridge up to and including a first locking pin recess. The bridge can be simply connected with the cylinder housing by inserting the first cylindrical end of the bridge into the cylindrical recess in the cylinder housing and by thereupon rotating the bridge through an angle, such that the locking pin extends in the locking pin recess in the bridge. After that, with a locking bolt the thus assembled whole can be locked.

5 Claims, 11 Drawing Sheets

CYLINDER LOCK AND METHOD FOR MOUNTING SUCH A CYLINDER LOCK

FIELD

The invention relates to a cylinder lock and to a method for assembling such a cylinder lock.

BACKGROUND

Applicant currently markets a lock according to the pre-characterizing portion of claim 1. In that regard, see for instance the YouTube video uploaded on 26 Nov. 2021:

https://www.youtube.com/watch?v=tl_bnf85inq

An example of such a cylinder lock is shown in FIGS. 1-3. The known lock comprises a first cylinder housing 12. While FIG. 4 shows the cylinder housing of an example according to the invention, it is advisable, for the purpose of the following description of the known cylinder lock, to also consider the cylinder housing from FIG. 4. The only difference between the known cylinder housing and the new cylinder housing is in fact the presence of a fixed locking pin 38 in the new cylinder housing 12, whereas in the known cylinder housing this is a removable locking pin 38. The known cylinder housing 12 includes a first cylindrical recess 14 which extends along a first axis L1 and a second cylindrical recess 16 which extends along a second axis L2 which is parallel to the first axis L1. Both the first 14 and the second cylindrical recess 16 extend from an end 12*a* of the first cylinder housing 12. The first cylinder housing 12 further includes a first locking pin bore 18 which extends perpendicularly to the second axis L2 and extends partly through the second cylindrical recess 16. An axis L3 of the first locking pin bore 18 does not intersect the second axis L2, so that the first locking pin bore 18 is offset with respect to the second axis L2. The first cylinder housing 12 includes an internally threaded locking bolt bore 20 which extends perpendicularly to the second axis L2.

The known cylinder lock 10 further comprises a first lock cylinder 22 which in unlocked condition is received rotatably around the first axis L1 in the first cylindrical recess 14 in the first cylinder housing 12, and which in a locked condition is received nonrotatably in the first recess 14. A cam 24 is coupled with or is couplable with the first lock cylinder 22.

Further, the cylinder lock 10 comprises a bridge 28' which includes a central part 30' and a first cylindrical end 32'. The first cylindrical end 32' extends along a bridge axis L4 and is detachably receivable in the second cylindrical recess 16 in the first cylinder housing 12. The first cylindrical end 32' of the bridge 28' is provided with a single first locking pin recess 34' which extends along a first locking pin recess axis L5 which is perpendicular to the bridge axis L4 and is coaxial with the axis L3 of the first locking pin bore 18 when the bridge 28' and the first cylinder housing 12 are connected with each other. Further, the bridge 28' is provided with a first locking bolt passage 36' which has an axis L6 which extends perpendicularly to the bridge axis L4. In the assembled condition, a first locking pin 38 is received in the first locking pin bore 18 in the first cylinder housing 12. The first locking pin 38 extends in the first locking pin recess 34 of the bridge 28 when the bridge 28 and the first cylinder housing 12 are connected with each other. The cylinder lock 10 further includes a first locking bolt 40 with the aid of which the bridge 28 is detachably connected with the first cylinder housing 12.

The known cylinder lock can have a single cylinder housing 12. In that case, the lock is operable with a key from one side of the door only. It is also possible, however, that two cylinder housings are involved. An example thereof is shown in FIGS. 1-3. In that case, the known cylinder lock 10 includes a second cylinder housing 112 provided with a third cylindrical recess 114 which extends along the first axis L1 and a fourth cylindrical recess 116 which extends along the second axis L2. Both the third 114 and the fourth cylindrical recess 116 extend from an end 112*a* of the second cylinder housing 112. The second cylinder housing 112 is further provided with a second locking pin bore 118 which extends perpendicularly to the second axis L2 and extends partly through the fourth cylindrical recess 116. An axis L9 of the second locking pin bore 118 does not intersect the second axis L2, so that the second locking pin bore 118 is offset with respect to the second axis L2. The second cylinder housing 112 is provided with an internally threaded second locking bolt bore 120 which extends perpendicularly to the second axis L2. The known cylinder lock with two cylinder housings 12, 112 is further provided with a second lock cylinder 122 which in unlocked condition is received rotatably around the first axis L1 in the third cylindrical recess 114 in the second cylinder housing 112, and in a locked condition is received nonrotatably in the third recess 114. In this implementation of the known cylinder lock, the cam 24 is also coupled with or couplable with the second lock cylinder 122. The bridge 28' is provided with a second cylindrical end 44' which extends from the central part 30' of the bridge 28' along the bridge axis L4 and is remote from the first cylindrical end 32'. The second cylindrical end 44' is detachably receivable in the fourth cylindrical recess 116 in the second cylinder housing 112. The second cylindrical end 44' of the bridge 28' is provided with a single second locking pin recess 46' which extends along a second locking pin recess axis L7 which is perpendicular to the bridge axis L4 and is coaxial with the axis L9 of the second locking pin bore 118 when the bridge 28' and the second cylinder housing 112 are connected with each other. The bridge 28 is provided with a second locking bolt passage 48' which has an axis L8 which extends perpendicularly to the bridge axis L4. The known cylinder lock 10 is further provided with a second locking pin 138 which is fixedly received in the second locking pin bore 118 in the second cylinder housing 112 and which extends in the second locking pin recess 46' of the bridge 28' when the bridge 28 and the second cylinder housing 112 are connected with each other. With the aid of a second locking bolt 140, the bridge 28 is detachably connected with the second cylinder housing 112.

The known cylinder lock 10 can be supplied with bridges 28' of different lengths. Filling pieces can then be placed between the first cylinder housing 12 and the cam 24 and between the second cylinder housing 112 and the cam 24, the filling pieces then having the same circumferential contour as end 12*a*, 112*a* of the first and second cylinder housing 12, 112, respectively. For this, see the earlier-mentioned YouTube video. Thus, the length of the cylinder lock can be adapted to the thickness of the door in which the cylinder lock 10 is assembled.

SUMMARY

Although the known cylinder lock is eminently satisfactory in practice, assembling of the cylinder lock requires the necessary dexterity. As can be seen in the earlier-mentioned YouTube video, first the cylindrical end 32 is inserted into the second recess. Only then is the locking pin 38 pressed into the locking pin bore 18 and is a connection established between the bridge 28' and the first cylinder housing 12. This connection is then secured by placing and tightening of the locking bolt 40 in the locking bolt bore 20. When a cylinder lock 10 with two cylinder housings 12, 112 is involved, this assembly order also applies to the connecting of the second cylinder housing 112 with the bridge 28'. There too, first the second cylindrical end 44' is inserted into the fourth recess 116 and only then can the second locking pin 138 be pressed into the second locking pin bore 118. Before the first and/or second locking pin 38, 138 has been placed, the relevant cylinder housing 12, 112 is rotatable relative to the bridge 28' and the position of the relevant cylinder housing 12, 122 with respect to the other parts of the cylinder lock 10, such as, for example, the cam 24 and any filling pieces, is unstable. With that assembly of parts being unstable, the locking pin 38, 138 should then be fitted in the locking pin bore 18, 118 while, to make that possible, also the bridge 28' has to be aligned, so that the locking pin 38, 138 can also pass the locking pin recess 34', 46'. This requires great dexterity of the one who assembles the lock, and a private individual, who needs to do this only a few times, hence finds the assembly difficult.

The invention contemplates the provision of a cylinder lock of the type described in the pre-characterizing portion of claim 1, which can be simply assembled and disassembled. To this end, the known cylinder lock described hereinabove is characterized in that the first locking pin is fixedly received in the locking pin bore and in that the first cylindrical end of the bridge is provided with a flattened side which extends at least from a free end, remote from the central part of the bridge, of the first cylindrical end of the bridge up to and including the first locking pin recess. The flattened side extends in a plane that includes an angle with the first locking pin recess axis, such that upon insertion of the first cylindrical end into the second recess in a first rotational position of the bridge with respect to the first cylinder housing, the first cylindrical end can pass the first locking pin at least in part due to the presence of the flattened side. After complete insertion of the first cylindrical end into the second recess, the bridge is rotatable to a second rotational position with respect to the first cylinder housing, in which second rotational position the first locking pin is received in the first locking pin recess, such that a displacement of the bridge relative to the first cylinder housing in axial direction along the second axis is hindered. In the second rotational position, the first locking bolt passage in the bridge and the first locking bolt bore in the first cylinder housing are coaxially oriented, such that the first locking bolt in assembled condition connects the first cylindrical end of the bridge and the first cylinder housing detachably with each other.

Instead of having to place a locking pin in a locking pin bore of an assembly that is still unstable in that the components thereof can mutually still move relative to each other and may get detached from each other, the cylinder lock according to the invention only requires inserting of the first cylindrical end into the second cylindrical recess and then rotating to the second rotational position to fix axial displacement of the first cylinder housing relative to the bridge. After that, only the rotation of the first cylinder housing relative to the bridge needs to be hindered. This can be simply effected by placing and tightening of the locking bolt. Assembling of the cylinder lock has thereby become much simpler, to such an extent, even, that an end user or private individual without experience can assemble the lock. Also disassembling of the cylinder lock according to the invention is much simpler than disassembling of the known cylinder lock. Only the locking bolt needs to be loosened, after which the bridge is to be rotated through 90° to enable removal of the first cylinder housing from the bridge. An operation that can be performed in a simple manner and with a very slight chance of damaging the cylinder lock.

The invention also provides a method for assembling the cylinder lock according to the invention. The method comprises:

- providing a cylinder lock according to the invention;
- inserting the first cylindrical end of the bridge into the second cylindrical recess of the first cylinder housing while the bridge is in the first rotational position with respect to the first cylinder housing, wherein the first cylindrical end can pass the first locking pin at least in part due to the presence of the flattened side on the first cylindrical end;
- after completely inserting the first cylindrical end into the second recess, rotating the bridge to the second rotational position with respect to the first cylinder housing, in which second rotational position the first locking pin is received in the first locking pin recess, such that a displacement of the bridge relative to the first cylinder housing in axial direction along the second axis is hindered, wherein in the second rotational position the first locking bolt passage in the bridge and the first locking bolt bore in the first cylinder housing are coaxially oriented, and
- mounting the first locking bolt whereby it extends through the first locking bolt passage in the bridge and engages the internal thread in the first locking bolt bore in the first cylinder housing such that the first cylindrical end of the bridge and the first cylinder housing are demountably connected with each other.

The invention will be further explained on the basis of an example that is represented in FIGS. 4-11. FIGS. 1-3 show a cylinder lock that is known from practice and that is already being marketed by applicant.

DETAILED DESCRIPTION

Figure 1:
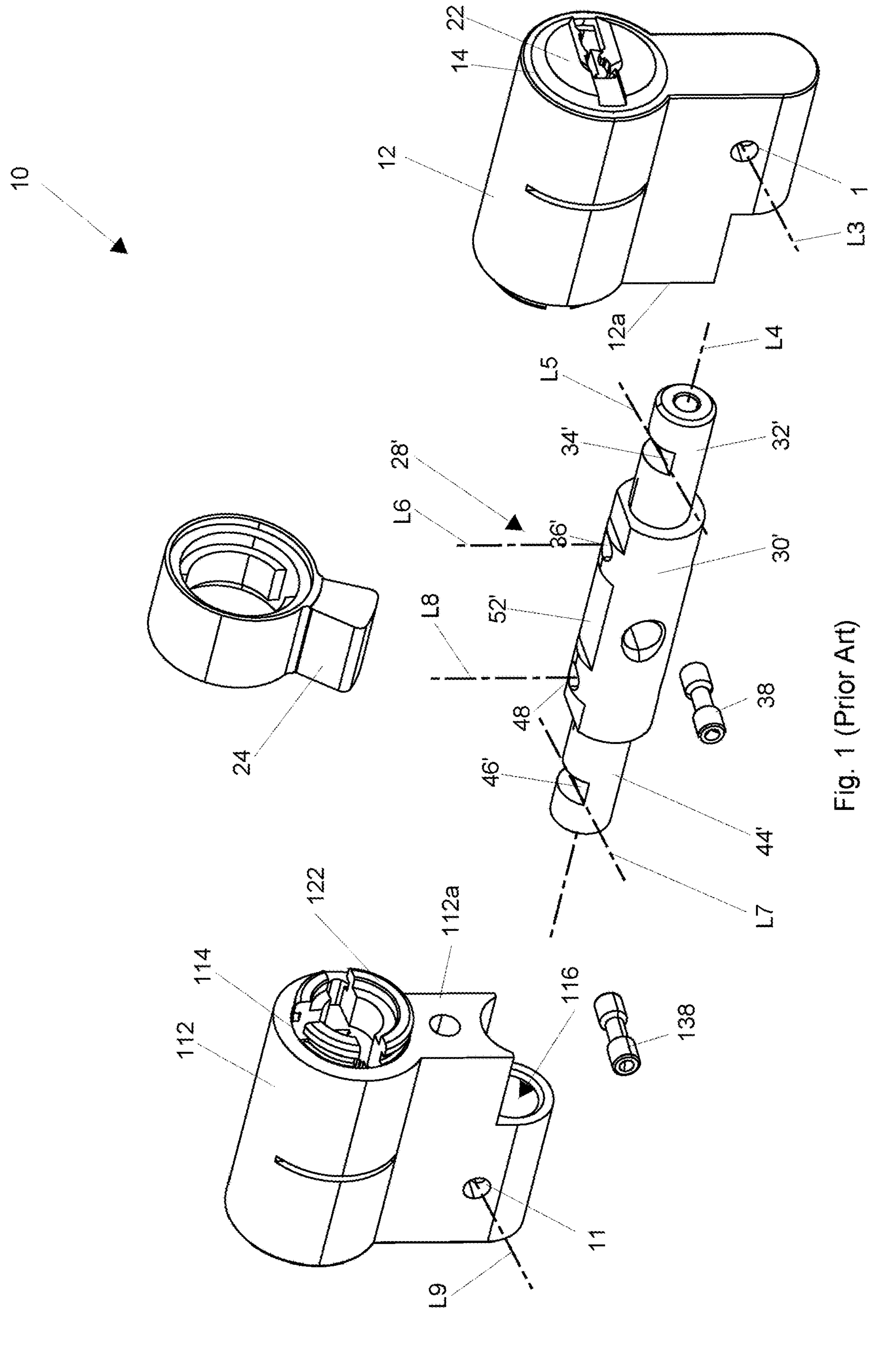
Fig. 1 (Prior Art)
FIG. 1 shows the known cylinder lock already discussed at length hereinabove in the background section, in an exploded view.
Figure 2:
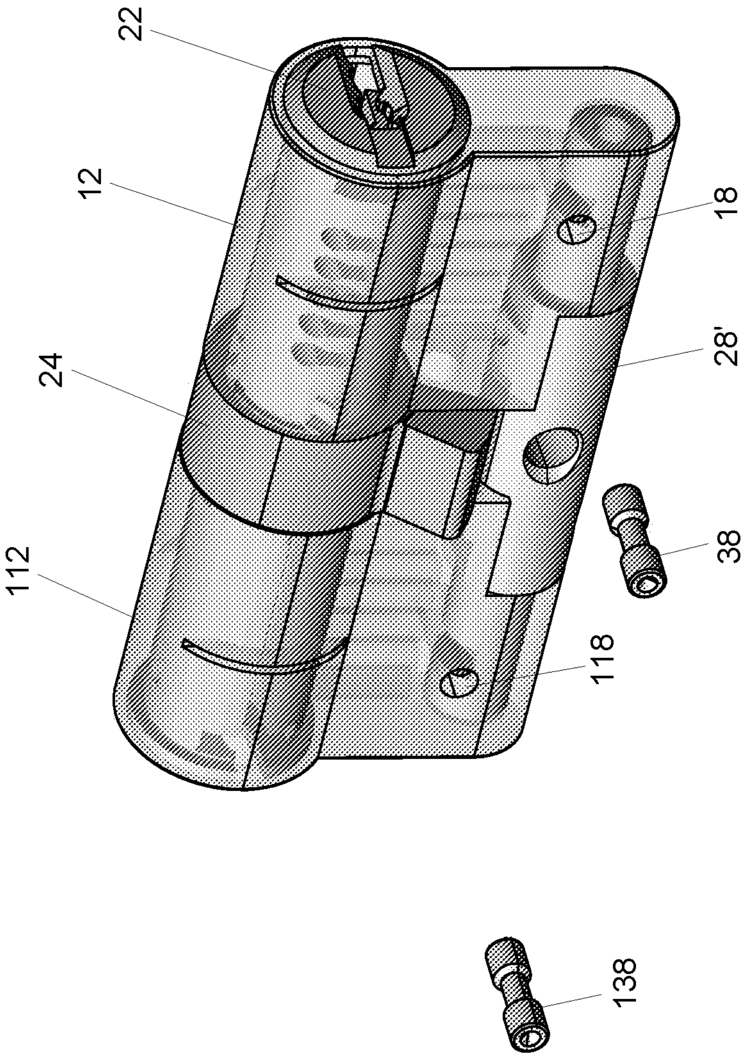
Fig. 2 (Prior Art)
FIG. 2 shows the known cylinder lock from FIG. 1 in a partly assembled condition.
Figure 3:
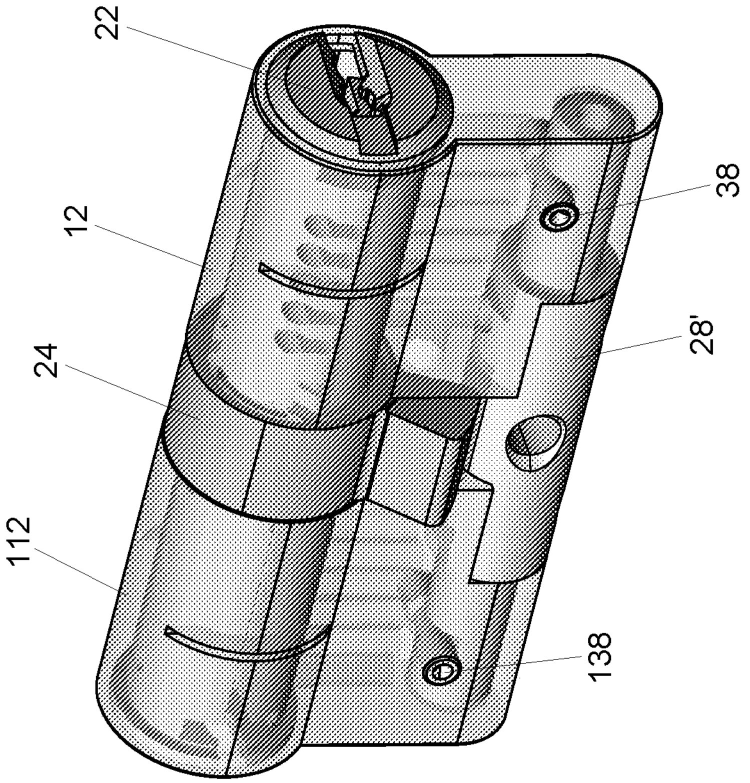
Fig. 3 (Prior Art)
FIG. 3 shows the known cylinder lock from FIG. 2 in wholly assembled condition.
Figure 4:
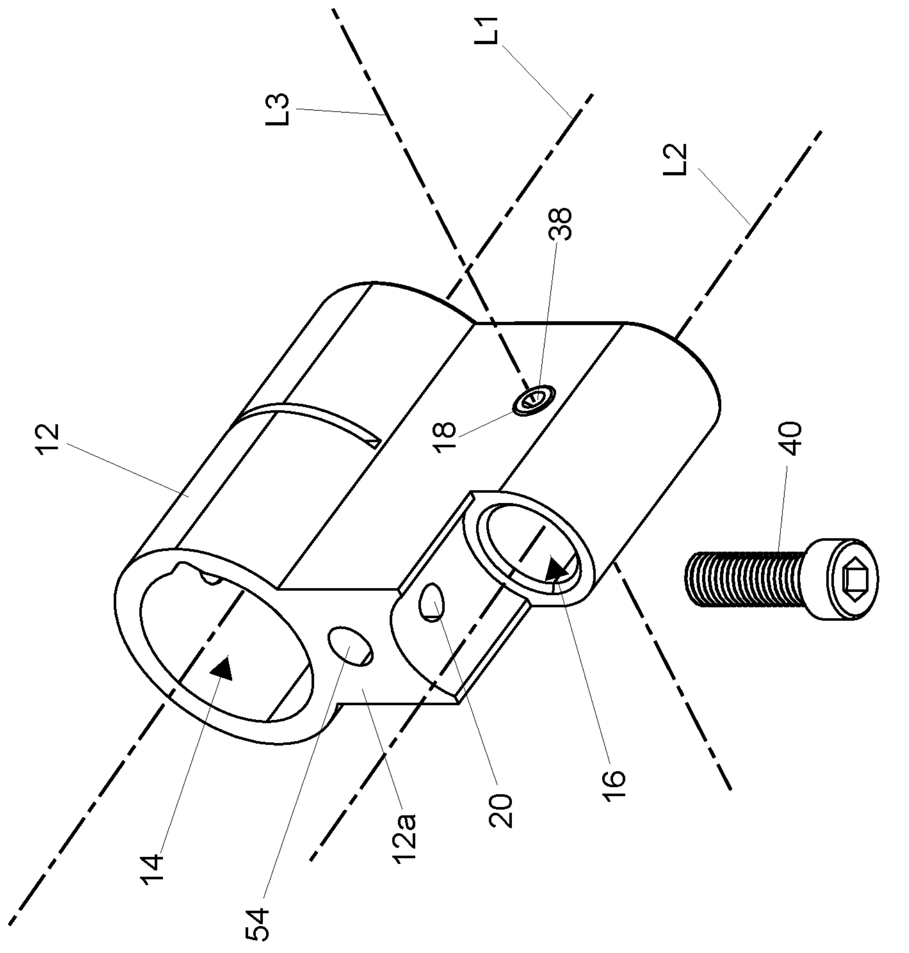
FIG. 4 shows a cylinder housing of the cylinder lock according to the invention with an associated locking bolt.

The cylinder lock 10 represented in FIGS. 1 to 3 is known from practice and is described at length in the background section of the present application. In assembling the known cylinder lock 10, first the first cylindrical end 32 is inserted into the second recess 16 (see FIG. 4) and only then is the locking pin 38 pressed into the locking pin bore 18. Placing the locking pin 38 in the locking pin bore 18 is no sinecure because the first cylinder housing 12 is rotatable relative to the bridge 28' and, moreover, is displaceable in axial direction relative to the bridge 28'. In addition, also the cam 24 has to be held in position, as well as any filling pieces. This requires much dexterity as well as experience. Indeed, for placement of the locking pin 38 it is also necessary, through suitable rotation of the bridge 28', to align the locking pin recess 34' with the locking pin bore 18 in the first cylinder housing. FIG. 2 shows the partly assembled known cylinder lock 10. All parts are still unstable relative to each other and have to be held in the correct position by hand. Not until the locking pins 38, 138 have been placed in the respective locking pin bores 18, 118 is a stable whole provided.

With the cylinder lock 10 according to the invention, an example of which is shown in FIGS. 7-11, this assembly problem is mitigated considerably and assembly of the cylinder lock 10 is accordingly rendered much simpler. So simple that a private end user could do it.

The cylinder lock 10 is provided with at least one cylinder housing 12, 112. The view of FIG. 4 clearly shows the end 12*a* of the first cylinder housing 12 and also the first cylindrical recess 14 which extends along a first axis L1 and the second cylindrical recess 16 which extends along a second axis L2. The first cylinder housing 12 is further provided with a first locking pin bore 18 which extends perpendicularly to the second axis L2 and extends partly through the second cylindrical recess 16. Further, a locking bolt bore 20 with internal thread is clearly visible, which is engaged in a mounted condition by a locking bolt 40. Also, it is clearly visible in FIG. 4 that the locking pin 38 has already been received in the locking pin bore 18 of the first cylinder housing 12. It is not intended for this locking pin 38, in disassembling, to be removed from the locking pin bore 18. The locking pin 38 is, in conformity with the invention, fixedly received in the locking pin bore 18.

The second cylinder housing 112 is implemented equally to the first cylinder housing 12. Only the nomenclature and the reference numerals of the second cylinder housing 112 that will be used hereinafter are different. For instance, the second cylinder housing 112 is provided with a third cylindrical recess 114 which corresponds to the first cylindrical recess 14 of the first cylinder housing 12. The fourth cylindrical recess 116 of the second cylinder housing 112 corresponds to the second cylindrical recess 16 of the first cylinder housing 12. The end 112*a* of the second cylinder housing 112 corresponds to the end 12*a* of the first cylinder housing 12. With the second cylinder housing 112 also, the associated locking pin 138 is fixedly received in the locking pin bore 118.

As is clearly visible in FIGS. 7-11, the cylinder lock 10 is further provided with a first lock cylinder 22 which in unlocked condition is received rotatably around the first axis L1 in the first cylindrical recess 14 in the first cylinder housing 12, and in a locked condition is received nonrotatably in the first recess 14. Unlocking of the rotation of the lock cylinder 22 takes place through insertion of a key into the lock cylinder 22. Locking of the rotation of the lock cylinder 22 takes place through retraction of the key from the lock. Further, the cylinder lock 10 is provided with a cam 24 which is coupled with or is couplable with the first lock cylinder 22.

In an embodiment, an example of which is shown in FIGS. 7-11, the cylinder lock 10 may further be provided with a second lock cylinder 122 which in unlocked condition is received rotatably around the first axis L1 in the third cylindrical recess 114 in the second cylinder housing 112, and in a locked condition is received nonrotatably in the third recess 114. In that embodiment, the cam 24 is coupled with or is couplable with the second lock cylinder 122.

Figure 5:
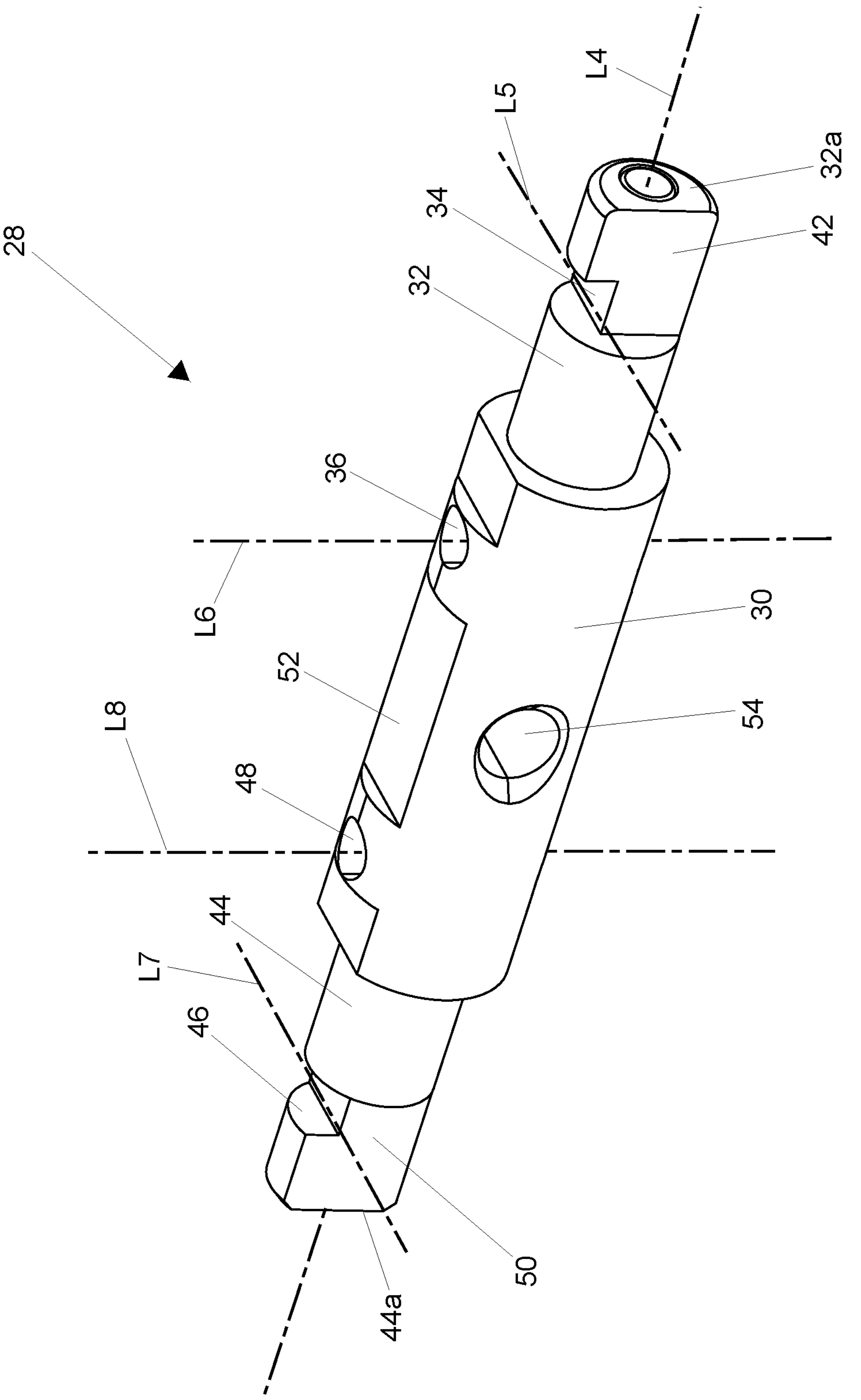
FIG. 5 shows the bridge of the cylinder lock according to the invention from a first point of view.
Figure 6:
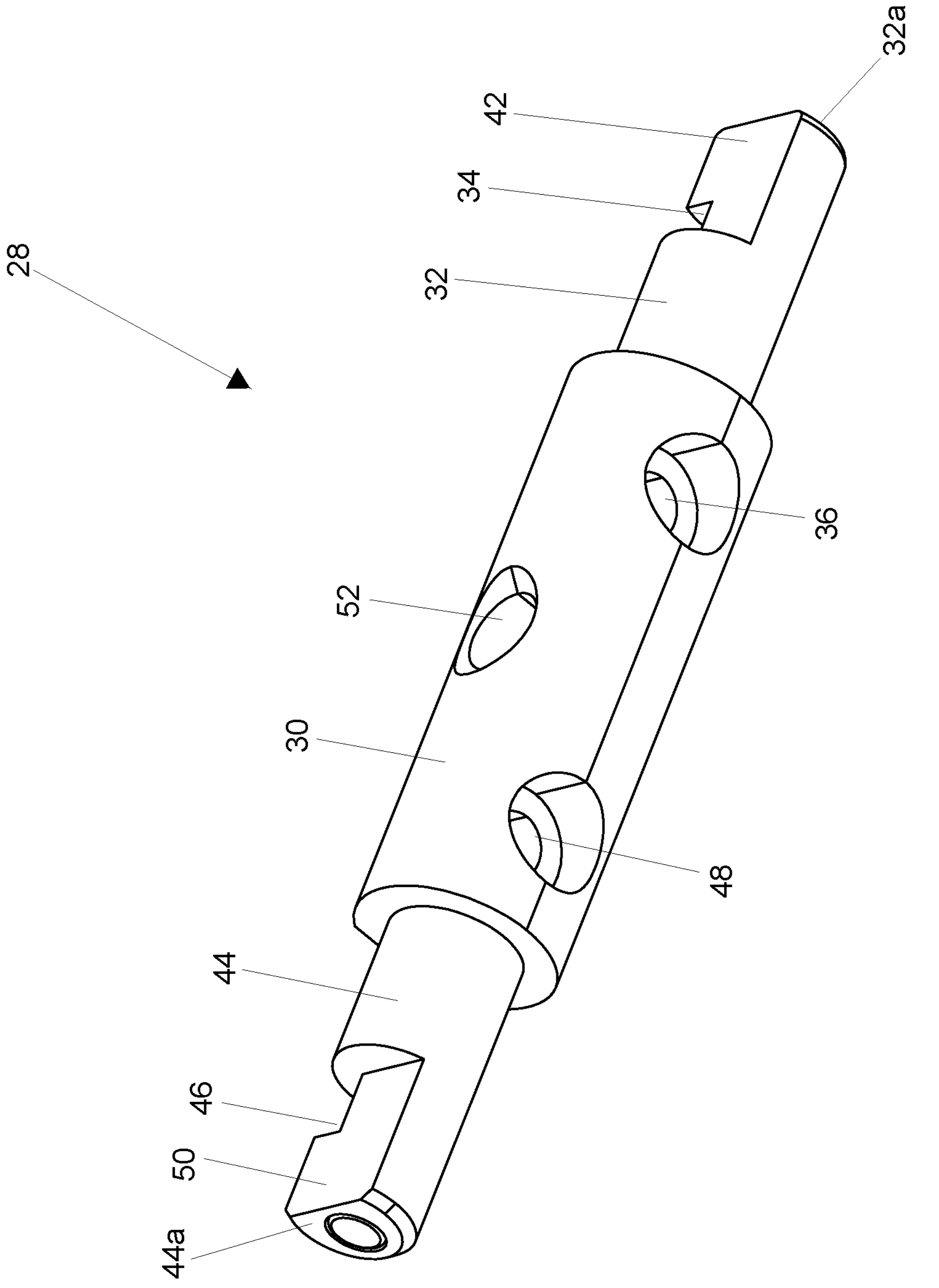
FIG. 6 shows the bridge represented in FIG. 5 from a second point of view.

FIGS. 5 and 6 show an example of the bridge 28 of the cylinder lock 10 according to the invention. Just as with the known bridge 28' which has been described in the background section above, the bridge 28 of the cylinder lock 10 according to the invention is provided with a central part 30 and a first cylindrical end 32. The first cylindrical end 32 extends along a bridge axis L4 and is detachably receivable in the second cylindrical recess 16 in the first cylinder housing 12. The first cylindrical end 32 of the bridge 28 is provided with a single first locking pin recess 34 which extends along a first locking pin recess axis L5 which is perpendicular to the bridge axis L4. Further, the bridge 28 is provided with a first locking bolt passage 36 which has an axis L6 which extends perpendicularly to the bridge axis L4.

According to the invention, the first cylindrical end 32 of the bridge 28 is provided with a flattened side 42 which extends at least from a free end 32*a*, remote from the central part 30 of the bridge 28, of the first cylindrical end 32 of the bridge 28 up to and including the first locking pin recess 34. The flattened side 42 extends in a plane that includes an angle with the first locking pin recess axis L5.

The example of the bridge 28 that is shown in FIGS. 5 and 6 concerns an embodiment of the invention in that this bridge 28 is destined to be connected with both a first cylinder housing 12 and a second cylinder housing 112. In the most basic implementation of the cylinder lock 10 according to the invention, the bridge 28 may also be implemented so as to be only connected with a single cylinder housing 12.

However, in the embodiment that has two cylinder housings 12, 112, the bridge 28 is additionally provided with a second cylindrical end 44 which extends from the central part 30 of the bridge 28 along the bridge axis L4 and is remote from the first cylindrical end 32. The second cylindrical end 44 is detachably receivable in the fourth cylindrical recess 116 in the second cylinder housing 112. The second cylindrical end 44 of the bridge 28 is provided with a single second locking pin recess 46 which extends along a second locking pin recess axis L7 which is perpendicular to the bridge axis L4. In this embodiment, the second cylindrical end 44 of the bridge 28 is also provided with a flattened side 50 which extends at least from a free end 44*a*, remote from the central part 30 of the bridge 28, of the second cylindrical end 44 of the bridge 28 up to and including the second locking pin recess 46. The flattened side 50 extends in a plane that includes an angle with the second locking pin recess axis L7. The bridge 28 is provided with a second locking bolt passage 48 which has an axis L8 which extends perpendicularly to the bridge axis L4.

In the assembled condition, a first locking pin 38 is received in the first locking pin bore 18 in the cylinder housing 12. The first locking pin 38 extends in the first locking pin recess 34 of the bridge 28 when the bridge 28 and the first cylinder housing 12 are connected with each other. The cylinder lock 10 is further provided with a first locking bolt 40 with the aid of which the bridge 28 is detachably connected with the first cylinder housing 12. In the assembled condition, the first locking pin recess axis L5 of the first locking pin recess 34 is coaxial with the axis L3 of the first locking pin bore 18. In the depicted embodiment with two cylinder housings 12, 112, it also holds for the second locking pin recess axis L7 of the second locking pin recess 46 that it is coaxial with the axis L9 of the second locking pin bore 118.

As has already been described in the summary, the invention provides a cylinder lock 10 that can be simply assembled. Due to the above described implementation of the fixed locking pins 38, 138 and the specially implemented bridge 28 with flattened cylindrical ends 32, 44, upon insertion of the first cylindrical end 32 into the second recess 16 in a first rotational position of the bridge 28 with respect to the first cylinder housing 12, the first cylindrical end 32 can pass the first locking pin 38 at least in part. After complete insertion of the first cylindrical end 32 into the second recess 16, the bridge 28 is rotatable to a second rotational position with respect to the first cylinder housing 12, in which second rotational position the first locking pin 38 is received in the locking pin recess 34, such that a displacement of the bridge 28 relative to the first cylinder housing 12 in axial direction along the second axis L2 is hindered. In the second rotational position, the first locking bolt passage 36 in the bridge 28 and the first locking bolt bore 20 in the first cylinder housing 12 are oriented coaxially, such that the first locking bolt 40 in assembled condition connects the first cylindrical end 32 of the bridge 28 and the first cylinder housing 12 detachably with each other.

In a similar simple manner, also the second cylinder housing 112 can be connected with the bridge 28. Due to the presence of the flattened side 50, upon insertion of the second cylindrical end 44 into the fourth recess 116 in a first rotational position of the bridge 28 with respect to the second cylinder housing 112, the second cylindrical end 44 can pass the second locking pin 138 at least in part. After complete insertion of the second cylindrical end 44 into the fourth recess 116 of the second cylinder housing 112, the bridge 28 is rotatable to a second rotational position with respect to the second cylinder housing 112, in which second rotational position the second locking pin 138 is received in the second locking pin recess 46, such that a displacement of the bridge 28 relative to the second cylinder housing 112 in axial direction along the second axis L2 is hindered. In this second rotational position, the second locking bolt passage 48 in the bridge 28 and the second locking bolt bore 120 in the second cylinder housing 112 are oriented coaxially, such that a second locking bolt 140 in assembled condition can connect the second cylindrical end 44 of the bridge 28 and the second cylinder housing 112 detachably with each other.

In an embodiment, an example of which is shown in FIGS. 5-11, the central part 30 of the bridge 28 can have a flattened side 52 which faces in the direction of the cam 24 and along which the cam 24 can pass the bridge 28. This flattened side 52 provides the possibility to give the central part 30 a somewhat larger diameter without this larger diameter hindering rotation of the cam 24.

As is clearly represented in the figures, the central part 30 of the bridge is provided with a passage 52 which is provided with internal screw thread in a known manner. In this passage 52, a bolt can engage, with the aid of which the cylinder lock can be secured in a door.

In an embodiment, an example of which is shown in FIGS. 4, 7-11, the first cylinder housing 12 can be provided, in the end 12*a* thereof, with a bore 54 having internal thread. A similar bore 154 may also be provided in the end 112*a* of the second cylinder housing 112. These bores 54, 154 can be used for mounting therein a bolt with the aid of which filling pieces can be attached to the respective first and second cylinder housings 12, 112. The circumferential contour of these filling pieces preferably corresponds to that of the ends 12*a*, 112*a* of the first and the second cylinder housing 12, 112, respectively. When in addition bridges 28 of different lengths are provided, for instance in that the various bridges 28 each have a central part 30 of a different length, a cylinder lock 10 of different lengths can be assembled from these components.

The method for assembling a cylinder lock according to the invention will now be further clarified below with reference to FIGS. 7-11.

Figure 7:
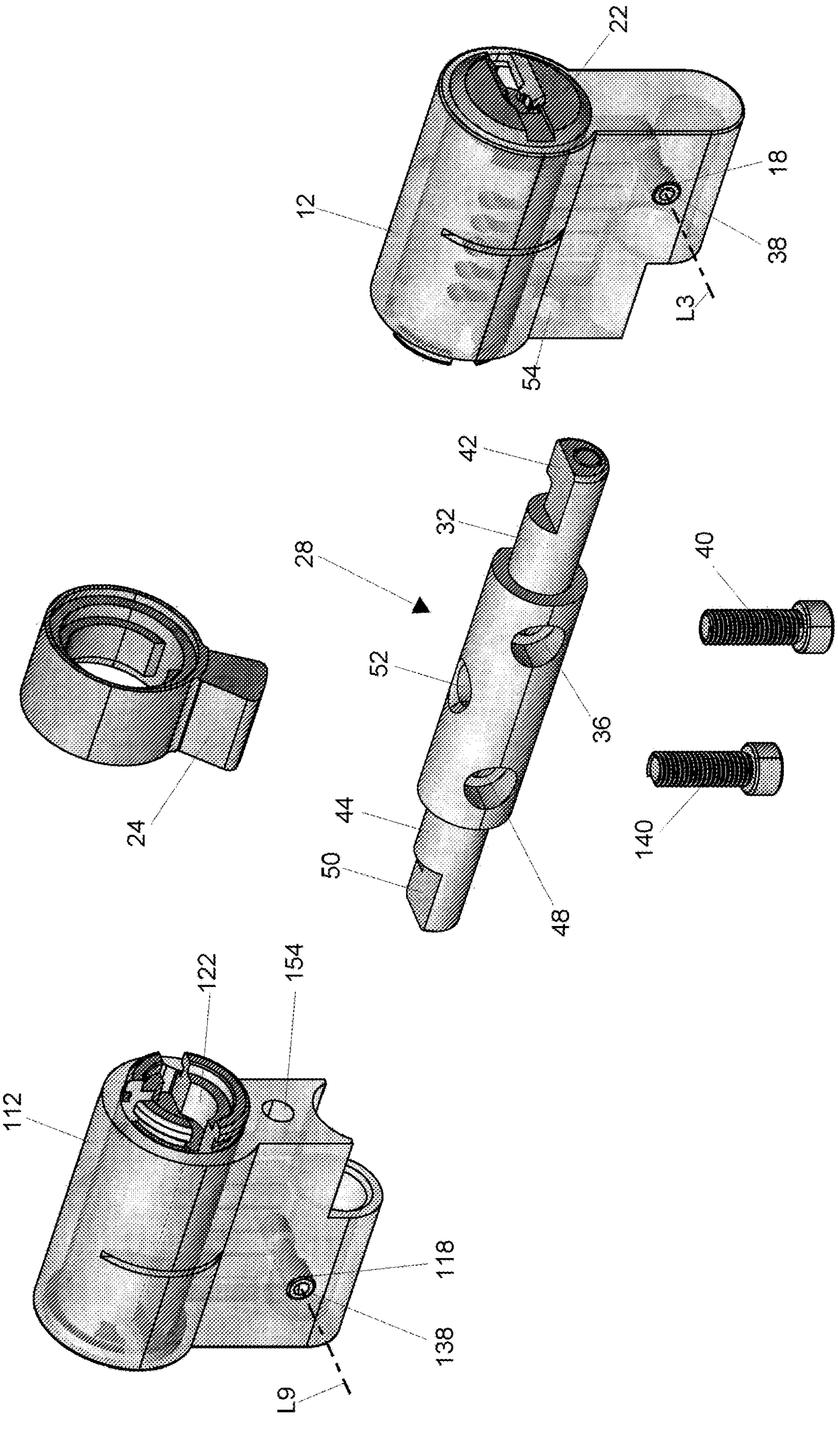
FIG. 7 shows an example of the cylinder lock according to the invention in an exploded view.

In FIG. 7 the different parts of the cylinder lock 10 are represented in a not yet assembled condition. Note that the first locking pin 38 has already been fixedly received in the locking pin bore 18 of the first cylinder housing 12. The same holds also for the second locking pin 138 which is fixedly received in the second locking pin bore 118 in the second cylinder housing 112.

In a first operation, the first cylindrical end 32 of the bridge 28 is inserted into the second cylindrical recess 16 of the first cylinder housing 12 while the bridge 28 is in the first rotational position with respect to the first cylinder housing 12. In this operation, the first cylindrical end 32 can pass the first locking pin 38 at least in part due to the presence of the flattened side 42 on the first cylindrical end 32.

In the embodiment with two cylinder housings 12, 112, this first operation of the method also comprises inserting of the second cylindrical end 44 of the bridge 28 into the fourth recess 116 of the second cylinder housing 112 while the bridge 28 is in the first rotational position with respect to the second cylinder housing 112. In this operation too, the second cylindrical end 44 can pass the second locking pin 138 at least in part due to the presence of the flattened side 50 on the second cylindrical end 44.

Figure 8:
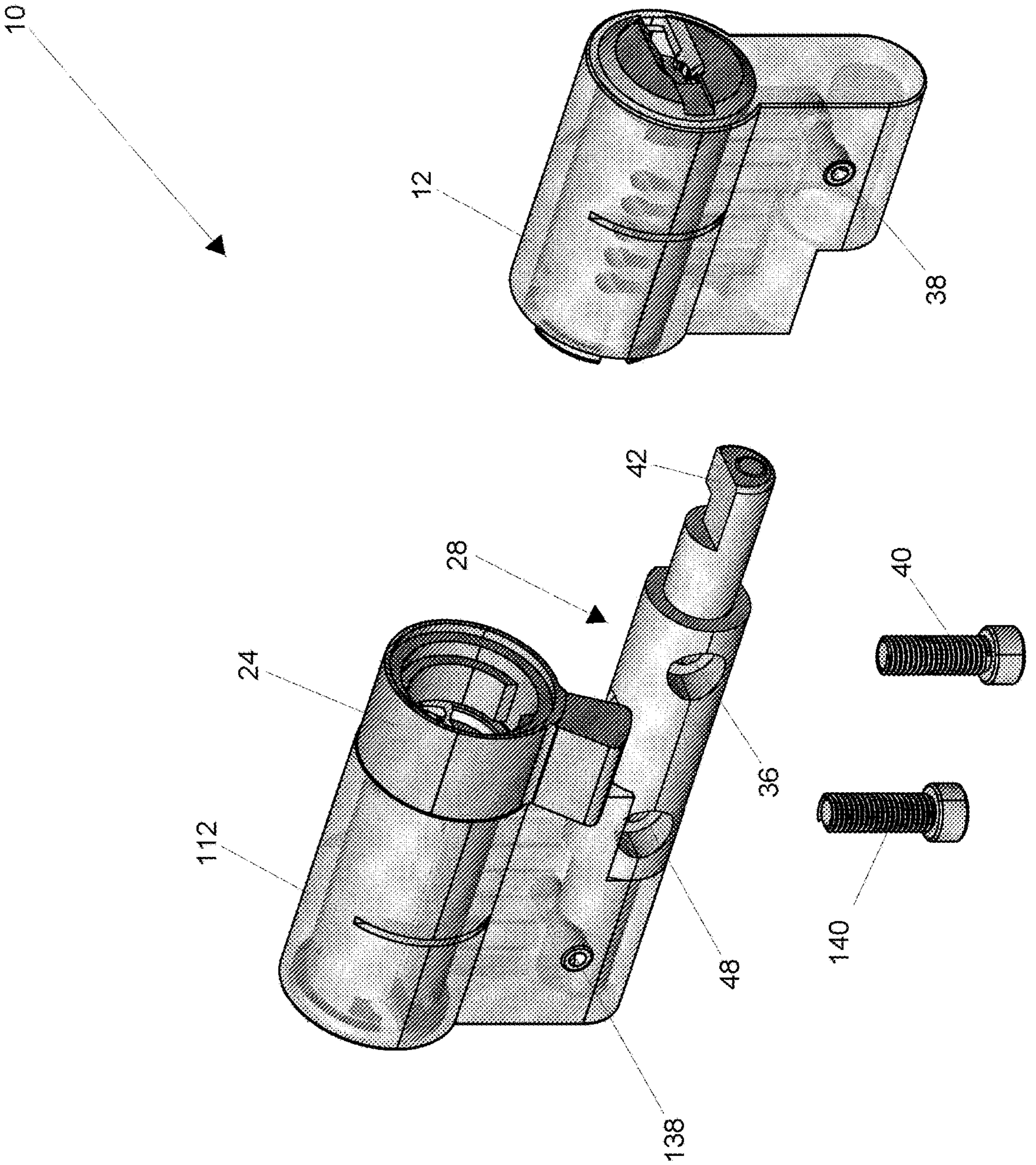
FIG. 8 shows the lock represented in FIG. 7, with the second cylindrical end inserted into the fourth recess of the second cylinder housing, and the bridge being in the first rotational position.

In FIG. 8 the situation is shown where the second cylindrical end 44 of the bridge has been inserted into the fourth recess 116 of the second cylinder housing 112 while the bridge 28 is in the first rotational position with respect to the second cylinder housing 112.

Figure 9:
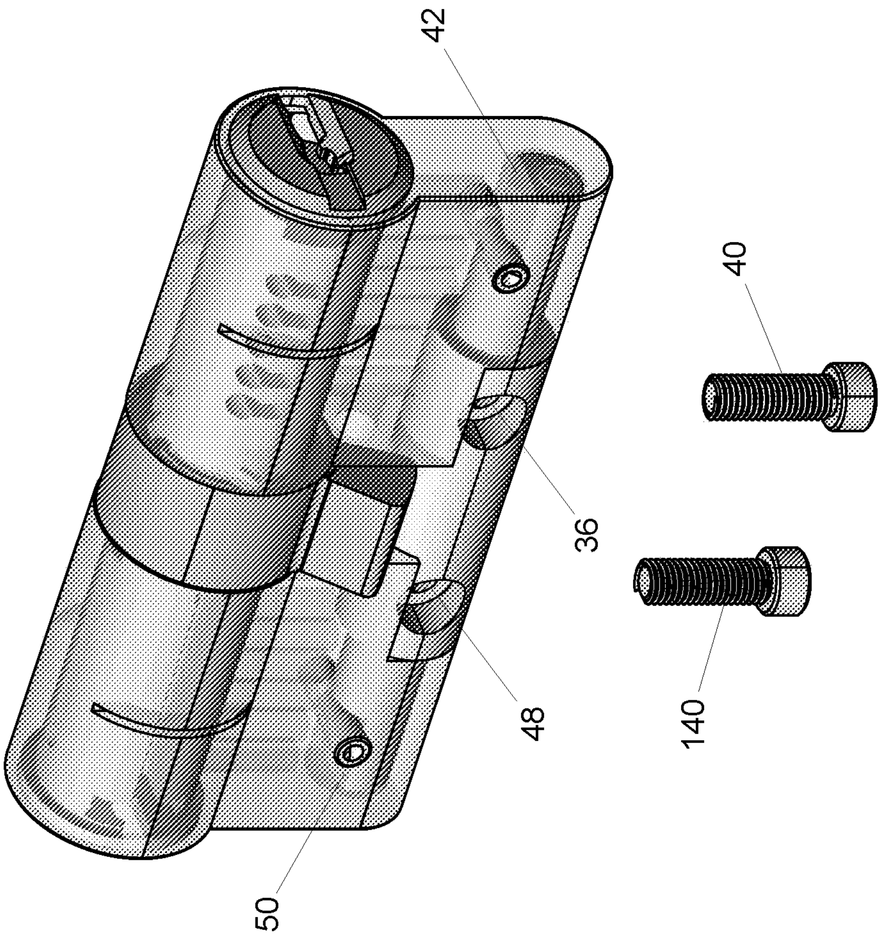
FIG. 9 shows the lock represented in FIG. 8, with the first cylindrical end inserted in the second recess of the first cylinder housing, and the bridge being in the first rotational position.

FIG. 9 shows the step where the first cylindrical end 32 of the bridge 28 has been inserted into the second cylindrical recess 16 of the first cylinder housing 12.

Figure 10:
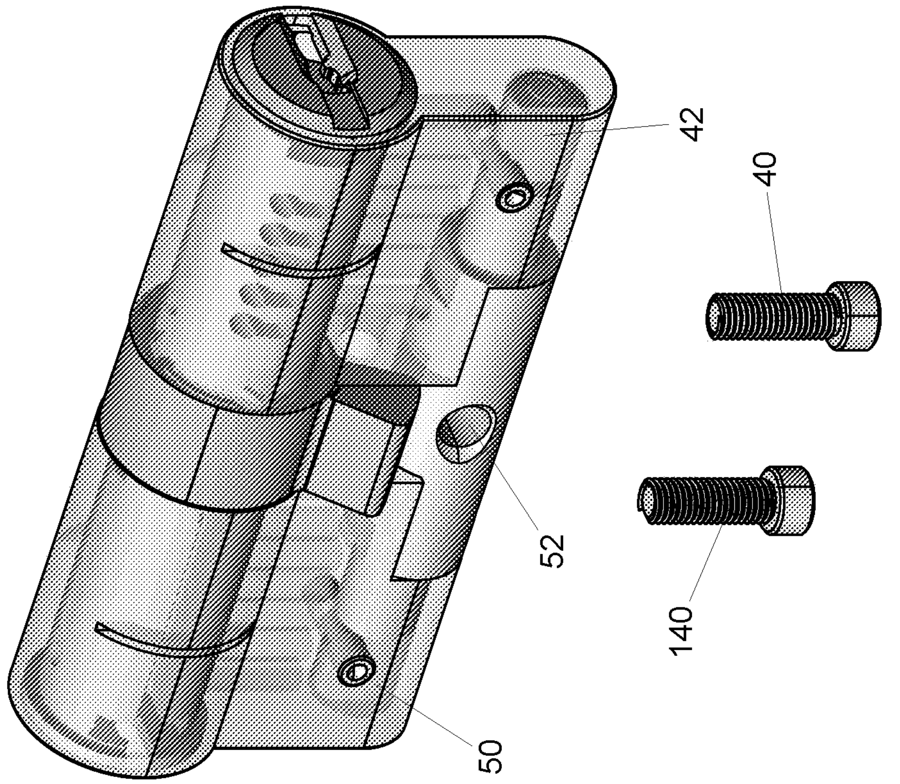
FIG. 10 shows the lock represented in FIG. 9, with the bridge rotated through 90° to the second rotational position, so that both the first and the second cylinder housing are fixed in axial direction relative to the bridge.

FIG. 10 shows that the bridge 28 has been rotated into the second rotational position with respect to the first and the second cylinder housing 12, 112. In this second rotational position the first locking pin 38 is received in the first locking pin recess 34, such that a displacement of the bridge 28 relative to the first cylinder housing 12 in axial direction along the second axis L2 is hindered. Also, the first locking bolt passage 36 in the bridge 28 and the first locking bolt bore 20 in the first cylinder housing 12 are coaxially oriented.

In the embodiment with two cylinder housings 12, 112, it also holds that in the second rotational position the second locking pin 138 is received in the second locking pin recess 46, such that a displacement of the bridge 28 relative to the second cylinder housing 112 in axial direction along the second axis L2 is hindered. In that second rotational position, also the second locking bolt passage 48 in the bridge 28 and the second locking bolt bore 120 in the second cylinder housing 112 are coaxially oriented.

Figure 11:
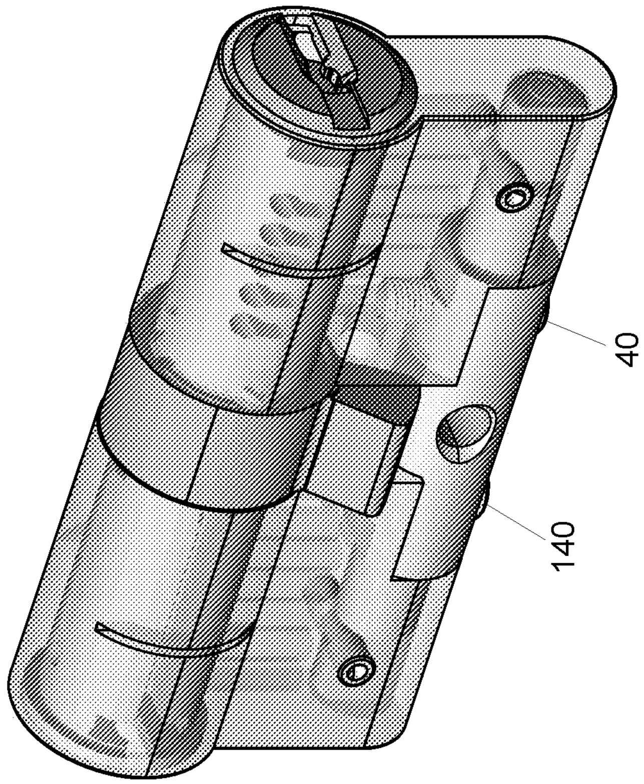
FIG. 11 shows the lock represented in FIG. 10, with the locking bolts placed and tightened so that the cylinder lock is in the assembled condition.

FIG. 11 next shows the assembled cylinder lock 10 in which also the last steps have been traversed, namely:

mounting of the first locking bolt 40 whereby it extends through the first locking bolt passage 36 in the bridge 28 and engages the internal thread in the first locking bolt bore 20 in the first cylinder housing 12, such that the first cylindrical end 32 of the bridge 28 and the first cylinder housing 12 are demountably connected with each other; and mounting of the second locking bolt 140 whereby it extends through the second locking bolt passage 48 in the bridge 28 and engages the internal thread in the second locking bolt bore 120 in the second cylinder housing 112, such that the second cylindrical end 44 of the bridge 28 and the second cylinder housing 112 are demountably connected with each other.

Also disassembling of the cylinder lock 10 according to the invention is much simpler than disassembling of the known cylinder lock. With the known cylinder lock 10, the locking pins 38, 138 had to be knocked out of the cylinder housings 12, 112 with a drift. This is an operation that can actually be performed in a safe and stable manner only with a special supporting jig and which, moreover, can also easily lead to damaging of the cylinder housing 12, 112. Moreover, a private individual will not readily perform such an operation, because he will be anxious about the damage he might cause to the cylinder lock 10. With the cylinder lock according to the invention, only the locking bolts 40, 140 will need to be loosened and the bridge 28 to be rotated through 90° to enable the first cylinder housing 12 and the second cylinder housing 112 to be removed from the bridge. This is an operation that can be performed in a simple manner and with very little chance of damage to the cylinder lock 10.

The invention is not limited to the exemplary embodiments described in the detailed description and shown in the figures. The protection is defined by the following appended claims.

The invention claimed is:

1. A cylinder lock comprising:

a first cylinder housing provided with a first cylindrical recess which extends along a first axis and a second cylindrical recess which extends along a second axis which is parallel to the first axis, wherein both the first and the second cylindrical recess extend from an end of the first cylinder housing, wherein the first cylinder housing is further provided with a first locking pin bore which extends perpendicularly to the second axis and extends partly through the second cylindrical recess, wherein an axis of the first locking pin bore does not intersect the second axis, so that the first locking pin bore is offset with respect to the second axis, wherein the first cylinder housing is provided with an internally threaded locking bolt bore which extends perpendicularly to the second axis;

a first lock cylinder which in unlocked condition is received rotatably around the first axis in the first cylindrical recess in the first cylinder housing and in a locked condition is received nonrotatably in the first recess;

a cam which is coupled with or is couplable with the first lock cylinder;

a bridge which is provided with a central part and a first cylindrical end, wherein the first cylindrical end extends along a bridge axis and is detachably receivable in the second cylindrical recess in the first cylinder housing, wherein the first cylindrical end of the bridge is provided with a single first locking pin recess which extends along a first locking pin recess axis which is perpendicular to the bridge axis and is coaxial with the axis of the first locking pin bore when the bridge and the first cylinder housing are connected with each other, wherein the bridge is provided with a first locking bolt passage which has an axis which extends perpendicularly to the bridge axis;

a first locking pin which is received in the first locking pin bore in the first cylinder housing and which extends in the first locking pin recess of the bridge when the bridge and the first cylinder housing are connected with each other; and a first locking bolt with the aid of which the bridge is detachably connected with the first cylinder housing, wherein the first locking pin is fixedly received in the locking pin bore, and;

wherein the first cylindrical end of the bridge is provided with a flattened side which extends at least from a free end, remote from the central part of the bridge, of the first cylindrical end of the bridge up to and including the first locking pin recess, wherein the flattened side extends in a plane that includes an angle with the first locking pin recess axis, such that, upon insertion of the first cylindrical end into the second recess in a first rotational position of the bridge with respect to the first cylinder housing, the first cylindrical end can pass the first locking pin at least in part due to the presence of the flattened side and wherein after complete insertion of the first cylindrical end into the second recess the bridge is rotatable to a second rotational position relative to the first cylinder housing, in which second rotational position the first locking pin is received in the first locking pin recess, such that a displacement of the bridge relative to the first cylinder housing in axial direction along the second axis is hindered, wherein in the second rotational position the first locking bolt passage in the bridge and the first locking bolt bore in the first cylinder housing are oriented coaxially, such that the first locking bolt in assembled condition connects the first cylindrical end of the bridge and the first cylinder housing detachably with each other.

2. The cylinder lock according to claim 1, provided with:

a second cylinder housing provided with a third cylindrical recess which extends along the first axis and a fourth cylindrical recess which extends along the second axis, wherein both the third and the fourth cylindrical recess extend from an end of the second cylinder housing, wherein the second cylinder housing is further provided with a second locking pin bore which extends perpendicularly to the second axis and extends partly through the fourth cylindrical recess, wherein an axis of the second locking pin bore does not intersect the second axis, so that the second locking pin bore is offset with respect to the second axis, wherein the second cylinder housing is provided with an internally threaded second locking bolt bore which extends perpendicularly to the second axis;

a second lock cylinder which in unlocked condition is received rotatably around the first axis in the third cylindrical recess in the second cylinder housing and in a locked condition is received nonrotatably in the third recess;

wherein the cam is coupled with or is couplable with the second lock cylinder;

wherein the bridge is provided with a second cylindrical end, which extends from the central part of the bridge along the bridge axis and is remote from the first cylindrical end, wherein the second cylindrical end is detachably receivable in the fourth cylindrical recess in the second cylinder housing, wherein the second cylindrical end of the bridge is provided with a single second locking pin recess which extends along a second locking pin recess axis which is perpendicular to the bridge axis and is coaxial with the axis of the second locking pin bore when the bridge and the second cylinder housing are connected with each other, wherein the bridge is provided with a second locking bolt passage which has an axis which extends perpendicularly to the bridge axis;

a second locking pin which is fixedly received in the second locking pin bore in the second cylinder housing and which extends in the second locking pin recess of the bridge when the bridge and the second cylinder housing are connected with each other;

a second locking bolt with the aid of which the bridge is detachably connected with the second cylinder housing; and wherein the second cylindrical end of the bridge is provided with a flattened side which extends at least from a free end, remote from the central part of the bridge, of the second cylindrical end of the bridge up to and including the second locking pin recess, wherein the flattened side extends in a plane that includes an angle with the second locking pin recess axis, such that, upon insertion of the second cylindrical end into the fourth recess in a first rotational position of the bridge with respect to the second cylinder housing, the second cylindrical end can pass the second locking pin at least in part due to the presence of the flattened side and wherein after complete insertion of the second cylindrical end into the fourth recess of the second cylinder housing the bridge is rotatable to a second rotational position with respect to the second cylinder housing, in which second rotational position the second locking pin is received in the second locking pin recess, such that a displacement of the bridge relative to the second cylinder housing in axial direction along the second axis is hindered, wherein in the second rotational position the second locking bolt passage in the bridge and the second locking bolt bore in the second cylinder housing are coaxially oriented, such that the second locking bolt in assembled condition connects the second cylindrical end of the bridge and the second cylinder housing detachably with each other.

3. The cylinder lock according to claim 1, wherein the central part of the bridge has a flattened side which faces in the direction of the cam and along which the cam can pass the bridge.

4. A method for mounting the cylinder lock according to claim 1, comprising:

providing the cylinder lock;

inserting the first cylindrical end of the bridge into the second cylindrical recess of the first cylinder housing while the bridge is in the first rotational position with respect to the first cylinder housing wherein the first cylindrical end can pass the first locking pin at least in part due to the presence of the flattened side on the first cylindrical end;

after completely inserting the first cylindrical end into the second recess, rotating the bridge to the second rotational position with respect to the first cylinder housing, in which second rotational position the first locking pin is received in the first locking pin recess, such that a displacement of the bridge relative to the first cylinder housing in axial direction along the second axis is hindered, wherein in the second rotational position the first locking bolt passage in the bridge and the first locking bolt bore in the first cylinder housing are coaxially oriented; and mounting the first locking bolt whereby the first locking bolt extends through the first locking bolt passage in the bridge and engages the internal thread in the first locking bolt bore in the first cylinder housing such that the first cylindrical end of the bridge and the first cylinder housing are demountably connected with each other.

5. The method according to claim 4, wherein the cylinder lock is provided with:

a second cylinder housing provided with a third cylindrical recess which extends along the first axis and a fourth cylindrical recess which extends along the second axis, wherein both the third and the fourth cylindrical recess extend from an end of the second cylinder housing, wherein the second cylinder housing is further provided with a second locking pin bore which extends perpendicularly to the second axis and extends partly through the fourth cylindrical recess, wherein an axis of the second locking pin bore does not intersect the second axis, so that the second locking pin bore is offset with respect to the second axis, wherein the second cylinder housing is provided with an internally threaded second locking bolt bore which extends perpendicularly to the second axis;

a second lock cylinder which in unlocked condition is received rotatably around the first axis in the third cylindrical recess in the second cylinder housing and in a locked condition is received nonrotatably in the third recess;

wherein the cam is coupled with or is couplable with the second lock cylinder;

wherein the bridge is provided with a second cylindrical end, which extends from the central part of the bridge along the bridge axis and is remote from the first cylindrical end, wherein the second cylindrical end is detachably receivable in the fourth cylindrical recess in the second cylinder housing, wherein the second cylindrical end of the bridge is provided with a single second locking pin recess which extends along a second locking pin recess axis which is perpendicular to the bridge axis and is coaxial with the axis of the second locking pin bore when the bridge and the second cylinder housing are connected with each other, wherein the bridge is provided with a second locking bolt passage which has an axis which extends perpendicularly to the bridge axis;

a second locking pin which is fixedly received in the second locking pin bore in the second cylinder housing and which extends in the second locking pin recess of the bridge when the bridge and the second cylinder housing are connected with each other;

a second locking bolt with the aid of which the bridge is detachably connected with the second cylinder housing; and wherein the second cylindrical end of the bridge is provided with a flattened side which extends at least from a free end, remote from the central part of the bridge, of the second cylindrical end of the bridge up to and including the second locking pin recess, wherein the flattened side extends in a plane that includes an angle with the second locking pin recess axis, such that, upon insertion of the second cylindrical end into the fourth recess in a first rotational position of the bridge with respect to the second cylinder housing, the second cylindrical end can pass the second locking pin at least in part due to the presence of the flattened side and wherein after complete insertion of the second cylindrical end into the fourth recess of the second cylinder housing the bridge is rotatable to a second rotational position with respect to the second cylinder housing, in which second rotational position the second locking pin is received in the second locking pin recess, such that a displacement of the bridge relative to the second cylinder housing in axial direction along the second axis is hindered, wherein in the second rotational position the second locking bolt passage in the bridge and the second locking bolt bore in the second cylinder housing are coaxially oriented, such that the second locking bolt in assembled condition connects the second cylindrical end of the bridge and the second cylinder housing detachably with each other, wherein the method further comprises:

inserting the second cylindrical end of the bridge into the fourth recess of the second cylinder housing while the bridge is in the first rotational position with respect to the second cylinder housing wherein the second cylindrical end can pass the second locking pin at least in part due to the presence of the flattened side on the second cylindrical end;

after completely inserting the second cylindrical end into the fourth recess, rotating the bridge to the second rotational position with respect to the second cylinder housing, in which second rotational position the second locking pin is received in the second locking pin recess, such that a displacement of the bridge relative to the second cylinder housing in axial direction along the second axis is hindered, wherein in the second rotational position the second locking bolt passage in the bridge and the second locking bolt bore in the second cylinder housing are coaxially oriented; and mounting the second locking bolt whereby the second locking bolt extends through the second locking bolt passage in the bridge and engages the internal thread in the second locking bolt bore in the second cylinder housing, such that the second cylindrical end of the bridge and the second cylinder housing are demountably connected with each other.

* * * * *